United States Patent [19]

Dörr et al.

[11] 4,368,183
[45] Jan. 11, 1983

[54] PROCESS OF PRODUCING CONCENTRATED SULFURIC ACID

[75] Inventors: Karl-Heinz Dörr, Mainz; Hugo Grimm, Miltenberg; Ulrich Sander, Friedrichsdorf; Robert Peichl, Kelheim; Franz Maier, Mark Schwaben, all of Fed. Rep. of Germany

[73] Assignees: Metallgesellschaft Aktiengesellschaft, Frankfurt am Main; Sudchemie Aktiengesellschaft, Munich, both of Fed. Rep. of Germany

[21] Appl. No.: 203,285

[22] Filed: Nov. 3, 1980

[30] Foreign Application Priority Data

Nov. 8, 1979 [DE] Fed. Rep. of Germany ....... 2945021

[51] Int. Cl.³ .................... C01B 17/82; C01B 17/76
[52] U.S. Cl. .................................................. 423/522
[58] Field of Search ................................. 423/522, 533

[56] References Cited

U.S. PATENT DOCUMENTS

| | | | |
|---|---|---|---|
| 2,629,651 | 2/1953 | Merrian et al. | 423/533 |
| 3,008,804 | 11/1961 | Rowedder | 423/522 |
| 3,432,264 | 3/1969 | Bostwick et al. | 423/522 |
| 3,593,497 | 7/1971 | Grimm et al. | 423/522 |
| 3,656,900 | 4/1972 | Drechsel et al. | 423/533 |
| 3,780,166 | 12/1973 | Drechsel et al. | 423/533 |
| 3,788,043 | 1/1974 | Dorr et al. | 423/522 |
| 3,944,401 | 3/1976 | Dorr et al. | 423/522 |
| 3,950,493 | 4/1976 | Dorr et al. | 423/522 |
| 4,029,751 | 6/1977 | Dorr et al. | 423/522 |
| 4,064,233 | 12/1977 | Maier et al. | 423/533 |
| 4,088,742 | 5/1978 | Homme, Jr. | 423/522 |
| 4,212,855 | 7/1980 | Kerner et al. | 423/522 |

FOREIGN PATENT DOCUMENTS

| | | | |
|---|---|---|---|
| 1385698 | 12/1964 | France | 423/522 |
| 1267262 | 3/1972 | United Kingdom | 423/522 |

*Primary Examiner*—Gary P. Straub
*Attorney, Agent, or Firm*—Sprung, Horn, Kramer & Woods

[57] ABSTRACT

$SO_2$-containing, hot gases are catalytically converted in part in a first contacting stage. The water and the $SO_3$ formed is removed from the reaction gas. The remaining gas is heated and then supplied to the second contacting stage. The water vapor content in the reaction gas delivered by a first contacting stage corresponds to an $H_2O/SO_3$ mole ratio below 1. The reaction gas delivered by the first contacting stage is precooled by an indirect heat exchange to such a temperature that the wall temperatures of the heat exchanger are above the dew point temperature of the reaction gas. The precooled reaction gas entering a condensing stage is contacted in a venturi with cocurrent sulfuric acid of 98.0 to 100% concentration and a temperature of at least 95° C. The exit temperature of the gas from the condensing stage is maintained at least at 120° C. The gas rises in a succeeding absorption stage through a packing layer, which is contacted with trickling sulfuric acid having a concentration of 98 to 100% and a temperature of 70° to 120° C. The dry gas which leaves the absorption stage and has been freed from $SO_3$ is maintained at a temperature which is as high as or slightly higher than the temperature of the acid as it initially contacts the packing in the absorption stage. The sulfuric acid concentration is controlled by a supply of water into the sulfuric acid in the condensing and/or absorption stage.

6 Claims, 2 Drawing Figures

PROCESS OF PRODUCING CONCENTRATED SULFURIC ACID

BACKGROUND OF THE INVENTION

1. Field of the Invention

This invention relates to a process of producing concentrated sulfuric acid by a catalytic reaction of $SO_2$ to $SO_3$, wherein $SO_2$-containing, hot, humid gases are used in which the ratio of $H_2O$ to $SO_3$ is sub-stoichiometric, and the catalytic reaction of the $SO_2$ content is effected in two contacting stages, the reactant gas is partly reacted in the first contacting stage and is then cooled by an indirect heat exchange, the cooled reactant gas is cooled further in that concentrated sulfuric acid is sprayed into the gas, such as in several steps, whereby sulfuric acid vapor is condensed and residual $SO_3$ and water vapor are absorbed, and the gas is subsequently heated by an indirect heat exchange and is then fed to the second contacting stage.

2. Discussion of Prior Art

The catalytic reaction of $SO_2$ to $SO_3$ in contacting plants may be carried out with dried gases or by so-called wet catalysis with humid gases. Humid gases contain a water content which is sufficient to form sulfuric acid with at least part of the formed $SO_3$ by condensation. The use of humid gases affords the advantage that drying costs can be saved. On the other hand, sulfuric acid mist may be formed as the $H_2O$ and $SO_3$ contents of the gases condense.

It has also been proposed to carry out the catalytic reaction in two contacting stages and to remove by an intermediate condensing and absorbing step the $SO_3$ which has been formed by the reaction in the first contacting stage, as well as the water vapor content. The residual $SO_2$ is then substantially reacted to form $SO_3$ in the second contacting stage, in which a dry catalysis is effected, and the $SO_3$ formed in said second stage is absorbed in an end absorber, which succeeds the last contacting tray. In this way, the drying stage required for a catalysis with dry gases can be saved. Such process is known from British patent specification No. 475,120. The gases leaving the first contacting stage contain water in a quantity which is stoichiometrically related to the $SO_3$ content of the gases for a condensation of 90 to 98% sulfuric acid and are slowly cooled to about 200° to 250° C. by an indirect heat exchange. A substoichiometric ratio of $H_2O$ to $SO_3$ will cause a formation of finely dispersed mists, which can be removed only with great difficulty. The disadvantages reside in that it is not possible under the conditions of practical operation to adjust and maintain the stoichiometric water vapor contents by an exactly proportioned addition of water vapor so that an optimum condensation cannot be effected. Additionally, the sulfuric acid vapor pressure under the operating conditions of the condensing system is so high that considerable mist problems arise in the end absorber.

It is known from U.S. Pat. No. 2,471,072 to cool the gases which have left the first contacting stage at a temperature of 538° to 704° C. to a temperature below 166° C. by an injection of counter-current sulfuric acid having a concentration up to 93%. This results in a formation of sulfuric acid having a concentration of 60 to 93%. In a second stage, the gases are cooled by an indirect heat exchange to 24° to 43° C. This results in a formation of sulfuric acid having a concentration of 4 to 6%. Thereafter, the gases are passed through a coke filter and a drying tower and subsequently enter the second contacting stage. The disadvantages reside in that weak sulfuric acid is produced and an additional drying stage is required after the condensation.

From German No. 2,725,432 it is known to inject counter-current sulfuric acid into the uncooled gas which has left the first contacting stage. This results in a formation of sulfuric acid having a concentration of 96 to 98%. The ratio of $H_2O$ to $SO_2$ in the gas which is used amounts to 1.0 to 1.25, which means that when more than 90% of the $SO_2$ are reacted in the first contacting stage the ratio of $H_2O$ to $SO_3$ will be stoichiometric for the condensation of acid containing 95 to 99% by weight of $H_2SO_4$. The stoichiometric ratio of $H_2O$ to $SO_3$ for a formation of sulfuric acid having a concentration of 95 to 99% has the disadvantage that the dew point temperature of the gases is very high so that the valuable sensible heat of the gas cannot be used, for instance, to generate steam. For this reason the entire sensible heat of the gases leaving the first contacting stage as well as the heat of condensation must be dissipated in the acid cooler of the acid cycle of the condensing tower, and the entire surplus gas heat of the contacting system is required to reheat the cold gases leaving the condensing system. A sub-stoichiometric operation would result in a very strong formation of mist in the condensing tower.

It is known from U.S. Pat. No. 4,064,223 to cool the gas leaving the first contacting stage to a temperature of 180° to 220° C. by an indirect heat exchange and then to inject cold sulfuric acid having a concentration of 96 to 99% into the gas cocurrently in a first cooling stage and counter-currently in a second cooling stage, whereby the gas is cooled to 40° to 60° C. and the water vapor is removed. The gas is subsequently heated to 200° C. and counter-current cold sulfuric acid having a concentration of 98 to 99% is injected into the gas in an absorber, to effect an absorption of $SO_3$. The gas is then reheated before it is fed to the second contacting stage. That process involves a strong formation of very fine mist in the first and second cooling stages. That fine mist is not removed in the third cooling stage and can be removed only by mist collectors, which are very expensive and involve high operating costs. Valuable sensible gas heat from the contacting system is required to reheat the gases after the second cooling stage and an expensive acid cooler is required to cool the gases to a lower temperature in the first and second cooling stages.

It is an object of the invention to avoid the disadvantages of the known processes and to ensure particularly in the processing of gases having a substoichiometric ratio of $H_2O$ to $SO_3$ after the first contacting stage an optimum separation of the $H_2O$ and $SO_3$ contents while a formation of mist is avoided and an optimum utilization of the valuable heat of the gas from the contacting system is permitted.

SUMMARY OF THE INVENTION

This object is accomplished in accordance with the invention by a process wherein (a) the water vapor content of the reaction gas leaving the first contacting stage corresponds to an $H_2O/SO_3$ mole ratio below 1, (b) the reaction gas from the first contacting stage is precooled by an indirect heat exchange to such a temperature that the wall temperatures of the heat exchanger are above the dew point temperature of the reaction gas.

(c) the precooled reaction gas which has entered the condensing stage is contacted in a venturi with cocurrent sulfuric acid having a concentration of 98.0 to 100% and a temperature of at least 95° C., (d) the gas exit temperature of the condensing stage is maintained at or above 120° C., (e) the gas is caused to rise through a packing layer in a succeeding absorption stage and sulfuric acid having a concentration of 98 to 100% and a temperature of 70° to 120° C. is caused to trickle through the packing layer.

(f) the exit temperature of the dry, $SO_3$-free gas from the absorbing stage is maintained at or slightly above the temperature of the acid which is fed onto the packing in the absorption stage, and (g) the concentration of the sulfuric acid is controlled by a supply of water to the sulfuric acid to be supplied to the condensing and/or absorption stage.

Preferably the process is performed by maintaining an $H_2O/SO_3$ mole ratio in the gas leaving the first contacting stage of 0.1 to 0.99. The temperature of the gas can be between 450° and 600° C. It is preferably cooled by indirect heat exchange to a temperature of 200° to 370° C. but in any case to the extent that the wall temperature of the heat exchanger is above the dew point temperature of the reaction gas, preferably at least 30° C. above such dew point temperatures.

For step (e) there can be any of the usual and known mass transfer assisting packing materials e.g. Raschig rings, saddles etc. The purpose of step e is to effect absorption of $SO_3$ in the reaction gas and drying the remaining $SO_2$-containing gas.

Generally speaking the maintenance of a substoichiometric ratio of water to sulfur trioxide can be effected by controlled cooling of gases prior to their entry into the catalytic conversion whereby an excess of water content is condensed or by introducing water if there is a deficiency of water content in regard to the $SO_2$ content and the conversion rate to $SO_3$ in the first contacting stage.

In the cooling step (b), it is sufficient to operate the heat exchangers at a wall temperature which is a few degrees Centigrade, above the dew point temperature. Because the temperature in the gas stream are always higher, this will reliably avoid a condensation in the heat exchanger and in the gas duct leading to the condensing stage. The dew point temperature of the reaction gas depends on its water vapor content. The temperature of the sulfuric acid injected in step (c) into the venturi increase to about 140° C. as the water vapor content of the reaction gas increases. To ensure an adequate condensation, the maximum gas exit temperature in step (d) is about 170° C. The exit temperature of the gas in step (f) may be up to about 10° C. above the temperature at which the acid enters. The temperatures are so adjusted in dependence on the water vapor content of the reaction gas that a good condensation is effected without formation of a mist and with a minimum dissipation of sensible gas heat into the acid system.

The $SO_2$ content of the contacting gas is suitably between about 8 and 13%. In principle, gases having a lower $SO_2$ content may be processed too but the specific operating costs will then be much higher.

According to a preferred further feature, the reaction gas delivered from the first contacting stage is precooled by an indirect heat exchange with the exit gas from the absorption stage in a first countercurrent heat exchanger and in a second cocurrent heat exchanger and the exit gas is passed first through the second and then through the first heat exchanger and thereafter into the second contacting stage. This will enable a considerable utilization of the reaction gas delivered by the first contacting stage so that the exit gas from the absorption stage can be heated to the operating temperature of the second contacting stage without an additional supply of high-grade gas heat from the contacting system. At the same time, an adequate temperature difference between the dew point temperature of the gases and the lowest wall temperature of the heat exchanger can be maintained. Each heat exchanger may consist of a plurality of units connected in series.

According to a preferred further feature, the reaction gas delivered from the first contacting stage is precooled in a heat exchanger by an indirect heat exchange with counter-current exit gas from the absorption stage after the exit gas of the absorption stage has previously been preheated in an additional heat exchanger by means of countercurrent $SO_3$-containing, hot gases of the contacting system. This feature will be particularly adopted when the contacting plant must be shut down relatively often for reasons of process technology or when fluctuating operating conditions are to be expected. With this arrangement, a higher temperature difference between the dew point temperature of the gases and the lowest wall temperature of the heat exchanger will be permissible.

According to a preferred further feature, the first contacting stage is operated to effect a conversion of 75 to 88% of $SO_2$ to $SO_3$. As a result, the reaction gas leaving the first contacting stage is at a higher temperature so that a higher difference between the dew point temperature of the reacting gas and the lowest wall temperature can be maintained in the heat exchangers for cooling the humid reaction gas. In that case, two contacting trays are preferably used in each of the first and second contacting stages.

BRIEF DESCRIPTION OF THE DRAWINGS

The invention will be explained more in detail with reference to the drawings and an example.

DESCRIPTION OF SPECIFIC EMBODIMENTS

Figure 1:
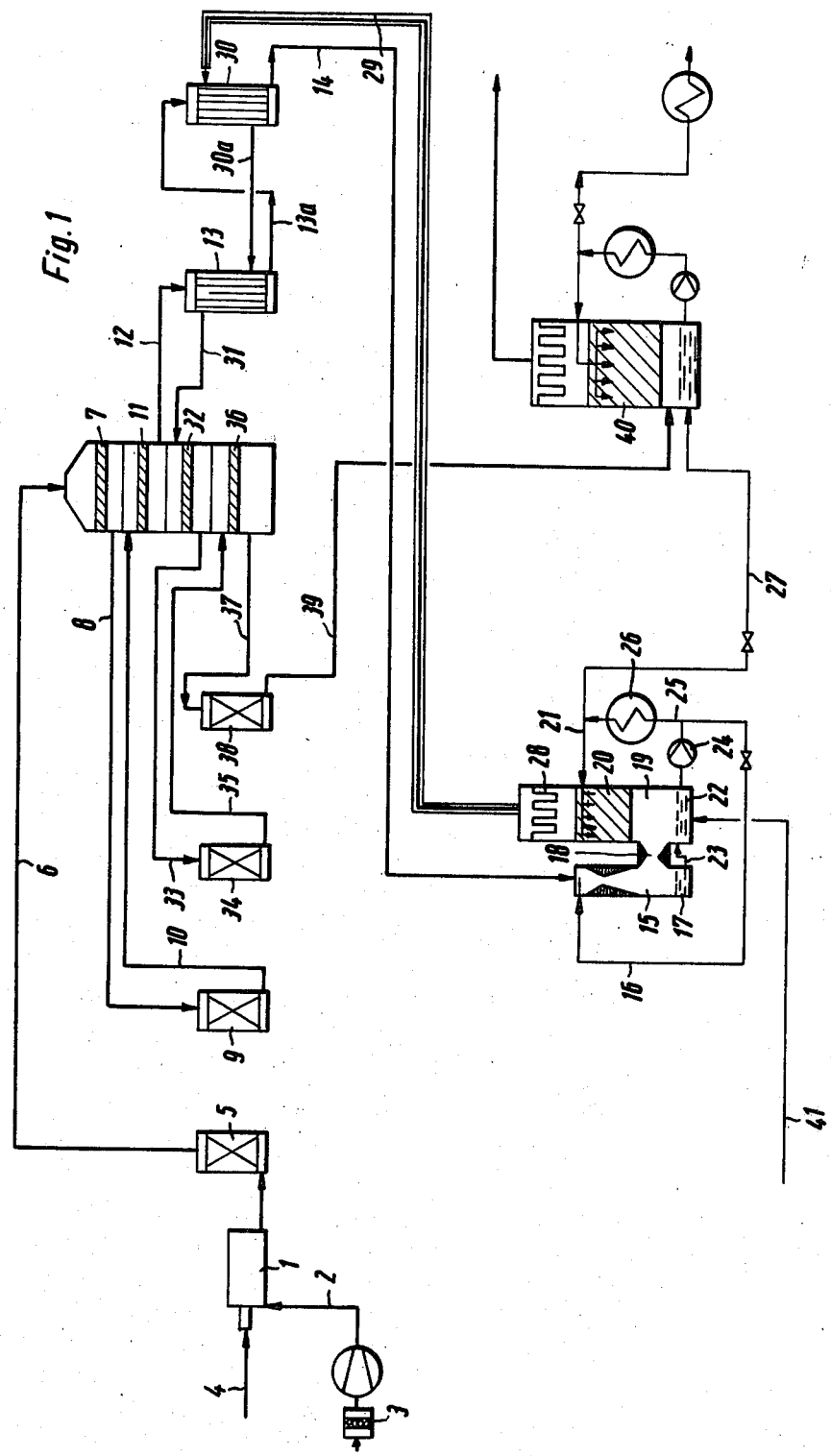
FIG. 1 is a diagrammatic flow scheme showing a contacting plant having two contacting trays in the first contacting stage and two contacting trays in the second contacting stage.

The sulfur-burning furnace 1 is supplied through duct 2 with undried air, from which solids have been removed in filter 3, and/or waste air which contains sulfur-containing compounds, such as $H_2S$, COS and $CS_2$, and is supplied through conduit 4 with liquid sulfur, which is reacted to form $SO_2$. The $SO_2$-containing humid gases are cooled in the waste-heat boiler 5 and are fed through conduit 6 into the first contacting tray 7. The gas delivered from the first contacting tray 7 through duct 8 is cooled in the steam superheater 9 and is fed through conduit 10 into the second contacting tray 11.

In accordance with FIG. 1, the gas is delivered from the second contacting tray 11, i.e., the first contacting stage through duct 12 into the first interstage heat exchanger 13, where the SO$_3$-containing humid gas is cooled with counter-current gas from the interstage condensing and absorption system. The cooled gas is supplied through duct 13a into the second interstage heat exchanger 30, where it is indirectly cooled further by cocurrent exit gas from the absorption stage before it is supplied through duct 14 into the venturi 15 of the condensing stage.

Sulfuric acid is injected from conduit 16 into the venturi 15. A major part of the condensate formed is collected together with the injected acid in the sump 17 of the venturi 15. The remaining SO$_3$-containing gas is passed through the connection 18 into the absorption stage 19 and rises through the latter through the packing layer 20, through which sulfuric acid trickles, which sulfuric acid has been supplied from above through conduit 21. The sulfuric acid thus formed and the trickling acid are collected in the sump 22.

The acid from the sump 17 is supplied through conduit 23 into the sump 22 and is then pumped by the pump 24 partly into conduit 16 and partly through conduit 25 and acid cooler 26 and then partly into conduit 21 and partly through conduit 27 into the end absorber 40.

The gas freed from SO$_3$ flows through the gas filter 28 and duct 29 into the second interstage heat exchanger 30, is heated there by the reaction gas, flows through duct 30a into the first interstage heat exchanger 13 and is heated there in countercurrent operation to the operating temperature of the second contacting stage and through duct 31 is supplied to the third contacting stage 32. The duct 29 is jacketed. The inner pipe is heated in order to avoid condensation.

The gas from the third contacting tray 32 is fed through duct 33 into the evaporator 34 and is cooled there and passed through duct 35 into the fourth contacting tray 36. From the latter, the gas is supplied through duct 37 into the economizer 38, in which it is cooled, and is then supplied through duct 39 into the end absorber 40. The process water required for the adjustment of the desired acid concentration is supplied through conduit 41 to the sump 22.

Figure 2:
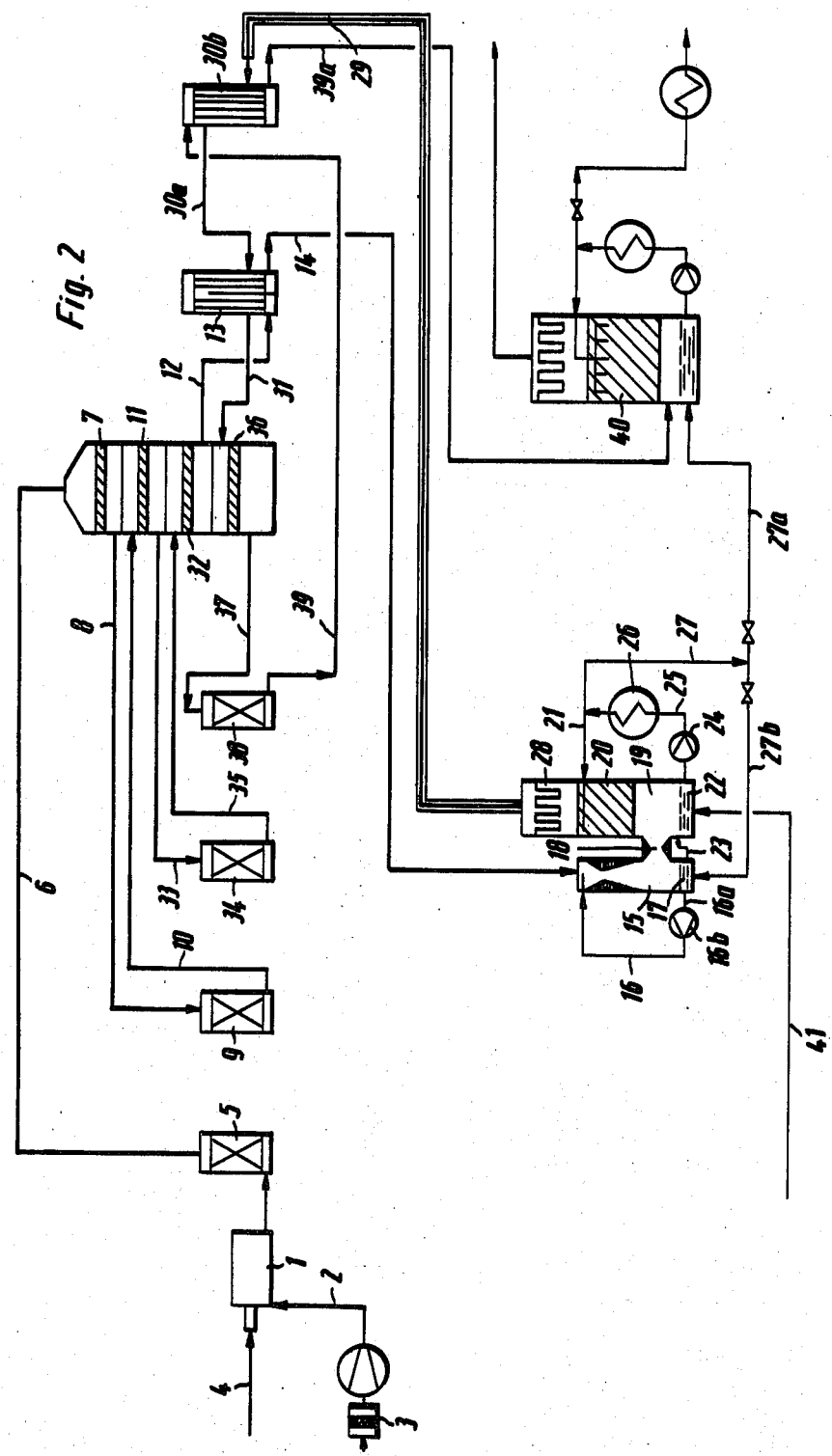
FIG. 2 is a diagrammatic flow scheme showing a contacting plant with three contacting trays in the first contacting stage and one contacting tray in the second contacting stage.

In accordance with FIG. 2, the gas leaves the second contacting tray 11 through duct 33 and is cooled in the evaporator-economizer 34 and then supplied through duct 35 into the third contacting tray 32. Gas is delivered from the third contacting tray 32, i.e., by the first contacting stage, through duct 12 into the interstage heat exchanger 13, where the SO$_3$-containing humid gas is cooled by countercurrent gas from the interstage condensing and absorption system and is then supplied through duct 14 into the venturi 15 of the condensing stage. Sulfuric acid from conduit 16 is injected into the venturi 15. A major part of the resulting condensate and the injected acid are collected in the sump 17 of the venturi 15. The remaining SO$_3$-containing gas is supplied through the connection 18 into the absorption stage 19 and thereafter rises through the packing layer 20, through which sulfuric acid supplied from above from circuit 21, trickles. The resulting sulfuric acid and the trickling acid are collected in the sump 22. The acid from the sump 17 is fed through conduit 23 into the sump 22 and is then pumped by pump 24 through conduit 25 and acid cooler 26 and partly into conduit 21 and partly into conduit 27.

Part of the acid from conduit 27 is supplied through conduit 27a into the end absorber 40; another part is supplied through conduit 27b into the sump 27. A circulation of the acid injected into the venturi 15 is maintained via conduit 16a, pump 16b and conduit 16. The gas freed from SO$_3$ flows through the gas filter 28 and duct 29 into the heat exchanger 30b and is preheated therein by countercurrent hot reaction gas from the fourth contacting tray. The preheated gas flows through duct 30a into the interstage heat exchanger 13 and is heated therein to the operating temperature of the fourth contacting tray by countercurrent hot reaction gas from the first contacting stage. The heated gas is supplied through duct 31 into the fourth contacting tray 36, from which gas is fed through duct 37 into the economizer 38, where it is cooled. The cooled gas is supplied through duct 39 into the heat exchanger 30b and through duct 39a into the end absorber 40. The process water required to adjust the desired acid concentration is fed through conduit 41 into the sump.

EXAMPLES

Table I relates to the operation in accordance with FIG. 1 and the reference numbers are those of FIG. 1. The examples compiled in Table II relate to an operation of the interstage condensation and absorption system shown in FIG. 1 but succeeding three contacting trays in the first contacting stage whereas the second contacting stage has only one contacting tray (in this respect see FIG. 2).

When it is necessary in the operation of a contacting system according to FIG. 1 greatly to increase the temperature differences between the dew point temperature of the SO$_3$-containing humid gases and the lowest wall temperature in the interstage heat exchangers, the gases from the absorption stage may be preheated by an operation as represented in FIG. 2. This will be the case when the operating conditions fluctuate strongly or when shutdowns are often required.

Table III relates to the operation according to Figure and the reference numbers are those of FIG. 2.

The Examples differ from each other in that the contacting gases and the resulting SO$_3$-containing gases from the first contacting stage have different water contents.

TABLE 1

| Line | | Example 1 | Example 2 | Example 3 |
|---|---|---|---|---|
| 6 | SO$_2$ content, % by volume SO$_2$ | 10 | 10 | 10 |
| | H$_2$O content, g H$_2$O standard m$^3$, dry | 15.6 | 36.9 | 53.8 |
| | Gas temperature, °C. | 440 | 440 | 440 |
| 12 | SO$_2$ conversion, % | 86 | 86 | 86 |
| | SO$_2$ content, % by volume SO$_2$ | 1.49 | 1.49 | 1.49 |
| | SO$_3$ content, % by volume SO$_3$ | 9.2 | 9.2 | 9.2 |
| | H$_2$O content, g H$_2$O/standard m$^3$, dry | 16.3 | 38.5 | 56.2 |
| | H$_2$O/SO$_3$ mole ratio | 0.22 | 0.52 | 0.76 |
| | Gas temperature, °C. | 527 | 527 | 527 |
| 13/30 | Minimum wall temperature, °C. | 195 | 218 | 232 |
| 13a | Gas temperature, °C. | 320 | 360 | 390 |
| 14 | Gas temperature, °C. | 257 | 310 | 327 |
| 16 | H$_2$SO$_4$ concentration, % by weight | | | |
| | H$_2$SO$_4$ | 98.8 | 98.8 | 98.8 |
| | Temperature, °C. | 120 | 127 | 130 |
| 18 | Gas temperature, °C. | 150 | 157 | 160 |
| 21 | H$_2$SO$_4$ concentration, % by weight | | | |
| | H$_2$SO$_4$ | 98.8 | 98.8 | 98.8 |
| | Temperature, °C. | 75 | 80 | 80 |
| 29 | Gas temperature, °C. | 75 | 80 | 80 |
| 30a | Gas temperature, °C. | 150 | 190 | 227 |
| 31 | Gas temperature, °C. | 440 | 440 | 440 |
| 41 | Addition of process water per metric ton of interstage | | | |

TABLE 1-continued

| Line | | Example 1 | Example 2 | Example 3 |
|---|---|---|---|---|
| | absorber acid, kg $H_2O$/t $H_2SO_4$ | 153 | 98.5 | 54.8 |

TABLE II

| Line | | Example 4 | Example 5 | Example 6 |
|---|---|---|---|---|
| 6 | $SO_2$ content, % by volume $SO_2$ | 10 | 10 | 10 |
| | $H_2O$ content, g $H_2O$/standard $m^3$, dry | 9.6 | 19.6 | 53.8 |
| | Gas temperature, °C. | 440 | 440 | 440 |
| 12 | $SO_2$ conversion, % | 95 | 95 | 95 |
| | $SO_2$ content, % by volume $SO_2$ | 0.48 | 0.48 | 0.48 |
| | $SO_3$ content, % by volume $SO_3$ | 10.1 | 10.1 | 10.1 |
| | $H_2O$ content, g $H_2O$/standard $m^3$, dry | 10 | 20.4 | 56.3 |
| | $H_2O/SO_3$ mole ratio | 0.12 | 0.25 | 0.70 |
| | Gas temperature, °C. | 475 | 475 | 475 |
| 13/30 | Minimum wall temperature, °C. | 180 | 199 | 232 |
| 13a | Gas temperature, °C. | 285 | 310 | 390 |
| 14 | Gas temperature, °C. | 227 | 266 | 353 |
| 16 | $H_2SO_4$ concentration, % by weight $H_2SO_4$ | 98.8 | 98.8 | 98.8 |
| | Temperature, °C. | 114 | 122 | 130 |
| 18 | Gas temperature, °C. | 134 | 152 | 160 |
| 21 | $H_2SO_4$ concentration, % by weight $H_2SO_4$ | 98.8 | 98.8 | 98.8 |
| | Temperature, °C. | 85 | 90 | 90 |
| 29 | Gas temperature, °C. | 85 | 90 | 90 |
| 30a | Gas temperature, °C. | 160 | 160 | 280 |
| 31 | Gas temperature, °C. | 420 | 420 | 420 |
| 41 | Addition of process water per metric ton of interstage absorber acid, kg $H_2O$/t $H_2SO_4$ | 171.1 | 147.9 | 68.1 |

TABLE III

| Line | | Example 7 | Example 8 | Example 9 |
|---|---|---|---|---|
| 6 | $SO_2$ content, % by volume $SO_2$ | 10 | 10 | 10 |
| | $H_2O$ content, g $H_2O$/standard $m^3$, dry | 9.6 | 19.6 | 53.8 |
| | Gas temperature, °C. | 440 | 440 | 440 |
| 12 | $SO_2$ conversion, % | 95 | 95 | 95 |
| | $SO_2$ content, % by volume | 0.48 | 0.48 | 0.48 |
| | $SO_3$ content, % by volume | 10.1 | 10.1 | 10.1 |
| | $H_2O$ content, g $H_2O$/standard $m^3$, dry | 10 | 20.4 | 56.3 |
| | $H_2O/SO_3$ mole ratio | 0.12 | 0.25 | 0.70 |
| | Gas temperature, °C. | 475 | 475 | 475 |
| 13 | Minimum wall temperature, °C. | 180 | 199 | 232 |
| 14 | Gas temperature, °C. | 279 | 296 | 328 |
| 16 | $H_2SO_4$ concentration, % by weight $H_2SO_4$ | 98.8 | 98.8 | 98.8 |
| | Temperature, °C. | 114 | 122 | 130 |
| 18 | Gas temperature, °C. | 134 | 152 | 160 |
| 21 | $H_2SO_4$ concentration, % by weight $H_2SO_4$ | 98.8 | 98.8 | 98.8 |
| | Temperature, °C. | 80 | 80 | 80 |
| 29 | Gas temperature, °C. | 80 | 80 | 80 |
| 30a | Gas temperature, °C. | 150 | 150 | 150 |
| 31 | Gas temperature, °C. | 420 | 420 | 420 |
| 41 | Addition of process water per metric ton of absorber acid, kg $H_2O$/t $H_2SO_4$ | 171.1 | 147.9 | 68.1 |

The advantages afforded by the invention reside in that although the ratio of $H_2O$ to $SO_3$ in the reaction gas after the first contacting stage is sub-stoichiometric, a formation of mist in the condensing and absorption system is substantially avoided so that the pressure loss in expensive gas filters for mist collection is greatly reduced. Compared with a stoichiometric or superstoichiometric operation, much more heat is recovered by the utilization of the high-grade sensible gas heat of the contacting system. This permits an economical production of concentrated sulfuric acid by a combustion of sulfur with undried air or by means of waste air which contains sulfur compounds, particularly because the drying of gas is eliminated. Compared with an operation in which the air for burning the sulfur is dried before, the invention affords the advantage that in spite of comparable rates of acid heat to be dissipated the cooling of the acid in the interstage condensing and absorption system is more favorable because the temperature level is higher there than in the dryer acid.

What is claimed is:

1. A process for producing concentrated sulfuric acid by a catalytic reaction of $SO_2$ to $SO_3$ which consists essentially of:

(a) treating a hot humid $SO_2$-containing gas in which the $H_2O$ to $SO_2$ ratio is less than 1 without drying the $SO_2$-containing gas by a process consisting essentially of feeding it into a first contacting stage containing a catalyst and therein converting $SO_2$ to $SO_3$;

(b) withdrawing reaction gas from said first contacting stage whose vapor content is maintained at an $H_2O/SO_3$ mol ratio below 1;

(c) cooling the reaction gas from the first contacting stage by indirect heat exchange to such an extent that the temperature of the walls of the heat exchanger is above the dew point temperature of the reaction gas;

(d) passing the so-cooled indirect heat exchanged reaction gas for direct heat exchange cooling into a condensing stage comprising a venturi by passing said reaction gas into said venturi co-currently with sprayed sulfuric acid having a concentration of 98.0 to 100 percent and a temperature of at least 95° C. whereby sulfuric acid vapor is condensed and $SO_3$ is absorbed;

(e) withdrawing residual unabsorbed $SO_3$ containing gas from said condensing stage at a temperature at or above 120° C. and up to 170° C.;

(f) passing said residual unabsorbed $SO_3$ containing gas into a succeeding absorption stage comprising a packing layer and passing said gas upwardly through said packing layer while trickling sulfuric acid having a concentration of 98 to 100 percent and a temperature of 70° to 120° C. through said packing layer;

(g) withdrawing dry, $SO_3$-free gas from said succeeding absorption stage at or slightly above the temperature of said sulfuric acid fed onto said packing layer;

(h) passing said dry, $SO_3$-free gas through an indirect heat exchanger whereby to heat the same;

(i) passing the so-heated dry, $SO_3$-free gas into a second contacting stage containing a catalyst and therein converting $SO_2$ in said gas to $SO_3$; and (j) controlling the concentration of sulfuric acid by a supply of water to the sulfuric acid supplied to the condensation and/or succeeding absorption stage.

2. A process according to claim 1, wherein the reaction gas delivered from the first contacting stage is precooled by an indirect heat exchange with the exit gas from the absorption stage in a first countercurrent heat exchanger and in a second cocurrent heat exchanger and the exit gas is passed first through the second and then through the first heat exchanger and thereafter into the second contacting stage.

3. A process according to claim 1, wherein the reaction gas delivered from the first contacting stage is precooled in a heat exchanger by an indirect heat exchange with counter-current exit gas from the absorption stage after the exit gas of the absorption stage has previously been preheated in an additional heat exchanger by means of countercurrent SO$_3$-containing hot gases of the contacting system.

4. A process according to claim 1 wherein the first contacting stage is operated to effect a conversion of 75 to 88% from SO$_2$ to SO$_3$.

5. A process according to claim 1 wherein the water content of the gas fed to the first contacting stage is 9.6 to 53.8 grams water per standard cubic meter of gas on a dry basis.

6. A process according to claim 1 wherein the water content of the gas fed to the first contacting stage is 15.6 to 53.8 grams water per standard cubic meter of gas on a dry basis.

* * * * *